US012223717B2

(12) United States Patent
Sheng et al.

(10) Patent No.: US 12,223,717 B2
(45) Date of Patent: Feb. 11, 2025

(54) METHOD, APPARATUS, DEVICE, AND STORAGE MEDIUM FOR DETERMINING IMPLANTATION LOCATION OF RECOMMENDATION INFORMATION

(71) Applicant: Tencent Technology (Shenzhen) Company Limited, Shenzhen (CN)

(72) Inventors: Hui Sheng, Shenzhen (CN); Dongbo Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/434,655

(22) Filed: Feb. 6, 2024

(65) Prior Publication Data
US 2024/0177481 A1 May 30, 2024

Related U.S. Application Data

(63) Continuation of application No. 17/379,835, filed on Jul. 19, 2021, now Pat. No. 11,928,863, which is a
(Continued)

(30) Foreign Application Priority Data

Jul. 19, 2019 (CN) .......................... 201910655586.8

(51) Int. Cl.
*G06K 9/62* (2022.01)
*G06V 20/40* (2022.01)
(Continued)

(52) U.S. Cl.
CPC .............. *G06V 20/41* (2022.01); *G06V 20/46* (2022.01); *G06V 20/48* (2022.01); *G06V 20/49* (2022.01);
(Continued)

(58) Field of Classification Search
CPC ........ G06V 20/41; G06V 20/46; G06V 20/48; G06V 20/49; G06V 20/40; H04N 5/265;
(Continued)

(56) References Cited

U.S. PATENT DOCUMENTS 7,168,084 B1 1/2007 Hendricks et al.
2016/0133027 A1 5/2016 Zhao et al.
(Continued)

FOREIGN PATENT DOCUMENTS

CN 1635789 A 7/2005
CN 101461235 A 6/2009
(Continued)

OTHER PUBLICATIONS

Tencent Technology, ISR, PCT/CN2020/096299, Sep. 21, 2020, 3 pgs.
(Continued)

*Primary Examiner* — Xin Jia
(74) *Attorney, Agent, or Firm* — Morgan, Lewis & Bockius LLP

(57) ABSTRACT

This application discloses a method for implementing recommendation information in a video performed at a computer device. The method includes: acquiring a target video; identifying a video segment within the target video according to a scene change status of video frames in the target video, the video segment including a target video frame; performing image recognition on the target video frame to obtain a region corresponding to an object in the target video frame that is compatible with the recommendation information; and implanting the recommendation information in the region of the target video frame. Image recognition processing is performed on the target video frame to obtain a video segment including the target video frame, so as to determine
(Continued)

the implantation location in the target video frame on the basis of the object of the target type in the target video frame.

20 Claims, 10 Drawing Sheets

Related U.S. Application Data continuation of application No. PCT/CN2020/096299, filed on Jun. 16, 2020.

(51) Int. Cl.
*H04N 5/265* (2006.01)
*H04N 21/44* (2011.01)
*H04N 21/81* (2011.01)

(52) U.S. Cl.
CPC ....... *H04N 5/265* (2013.01); *H04N 21/44008* (2013.01); *H04N 21/812* (2013.01)

(58) Field of Classification Search
CPC ........... H04N 21/44008; H04N 21/812; H04N 21/23418; H04N 21/854; H04N 21/44016; H04N 21/458; G11B 27/036; G11B 27/28

See application file for complete search history.

(56) References Cited

U.S. PATENT DOCUMENTS

| | | | |
|---|---|---|---|
| 2017/0358092 | A1 | 12/2017 | Bleibel et al. |
| 2019/0065856 | A1* | 2/2019 | Harris ................ G06F 18/2148 |
| 2021/0350136 | A1 | 11/2021 | Sheng et al. |

FOREIGN PATENT DOCUMENTS

| | | | |
|---|---|---|---|
| CN | 101529346 | A | 9/2009 |
| CN | 102291607 | A | 12/2011 |
| CN | 104735465 | A | 6/2015 |
| CN | 104967885 | A | 10/2015 |
| CN | 105120351 | A | 12/2015 |
| CN | 107734384 | A | 2/2018 |
| CN | 107835403 | A | 3/2018 |
| CN | 104822069 | B | 9/2018 |
| CN | 108632640 | A | 10/2018 |
| CN | 109302619 | A | 2/2019 |
| CN | 106375858 | B | 6/2019 |
| CN | 110381369 | A | 10/2019 |
| WO | WO 2015111840 | A1 | 7/2015 |

OTHER PUBLICATIONS

Tencent Technology, WO, PCT/CN2020/096299, Sep. 21, 2020, 5 pgs.
Tencent Technology, IPRP, PCT/CN2020/096299, Jan. 25, 2022, 6 pgs.

* cited by examiner

METHOD, APPARATUS, DEVICE, AND STORAGE MEDIUM FOR DETERMINING IMPLANTATION LOCATION OF RECOMMENDATION INFORMATION

CROSS-REFERENCE TO RELATED APPLICATIONS

This application is a continuation application of U.S. application Ser. No. 17/379,835, entitled "METHOD, APPARATUS, DEVICE, AND STORAGE MEDIUM FOR DETERMINING IMPLANTATION LOCATION OF RECOMMENDATION INFORMATION" filed on Jul. 19, 2021, which is a continuation application of PCT Patent Application No. PCT/CN2020/096299, entitled "METHOD, APPARATUS, DEVICE, AND STORAGE MEDIUM FOR DETERMINING IMPLANTATION LOCATION OF RECOMMENDATION INFORMATION" filed on Jun. 16, 2020, which claims priority to Chinese Patent Application No. 201910655586.8, entitled "METHOD, APPARATUS, DEVICE, AND STORAGE MEDIUM FOR DETERMINING IMPLANTATION LOCATION OF RECOMMENDATION INFORMATION" and filed on Jul. 19, 2019, both of which are incorporated herein by reference in their entirety.

FIELD OF THE TECHNOLOGY

Embodiments of this application relate to the field of artificial intelligence, and in particular, to a method, an apparatus, a device, and a storage medium for determining an implantation location of recommendation information.

BACKGROUND OF THE DISCLOSURE

A video-in advertisement is a relatively novel advertisement form: A print advertisement or a physical object is implanted at a location such as a desktop, a wall, a photo frame, or a billboard in a video, so as to promote a product. That is, in a process of advertisement implantation, it is first necessary to determine a location such as a desktop, a wall, a photo frame, or a billboard in the video to implement accurate implantation of the print advertisement or the physical object.

In a related technology, after a target video is viewed manually, and a location to be implanted with information that can be implanted with an advertisement and that appears in each scene is marked in a viewing process, advertisement content is implanted by a video editing person according to the marked location. For example, if the marked location is on a wall surface Ain the video, the video editing person implants an advertisement poster of a product B onto the wall surface A in the video.

However, when an advertisement is implanted in the foregoing manner, a detection person needs to view the full target video, and observe and mark a location to be implanted with information in a viewing process. Duration required for completing marking of the target video generally reaches 1.5 times of total duration of the target video, a marking workload is relatively large, and marking efficiency is relatively low. Consequently, advertisement implantation efficiency is also relatively low.

SUMMARY

Embodiments of this application provide a method, an apparatus, a device, and a storage medium for determining an implantation location of recommendation information, so as to resolve a problem that a marking task of a target video usually requires a relatively long time, has a relatively large marking workload, and has relatively low marking efficiency, and consequently, advertisement implantation efficiency is also relatively low. The technical solutions are as follows.

According to one aspect of this application, a method for determining an implantation location of recommendation information is performed at a computer device, and the method includes:

acquiring a target video, the target video being a video to be implanted with recommendation information;

acquiring a target video frame in the target video according to a scene change status of the target video, the target video frame being a video frame used for determining an implantation location of the recommendation information, and the scene change status being determined according to a similarity between at least one group of video frames in the target video;

performing image recognition on the target video frame to obtain masking information of the target video frame, the masking information including regions corresponding to at least two types of objects in the target video frame, the regions including a first region corresponding to an object of a target type in the target video frame; and determining an implantation location of the recommendation information in the target video frame based on the first region.

According to another aspect of this application, an apparatus for determining an implantation location of recommendation information is provided, where the apparatus includes:

an acquiring module, configured to acquire a target video, the target video being a video to be implanted with recommendation information;

the acquiring module being further configured to acquire a target video frame in the target video according to a scene change status of the target video, the target video frame being a video frame used for determining an implantation location of the recommendation information, and the scene change status being determined according to a similarity between at least one group of video frames in the target video;

a recognition module, configured to perform image recognition on the target video frame to obtain masking information of the target video frame, the masking information including regions corresponding to at least two types of objects in the target video frame, the regions including a first region corresponding to an object of a target type in the target video frame; and a determining module, configured to determine an implantation location of the recommendation information in the target video frame based on the first region.

According to another aspect of this application, a computer device is provided, including a processor and a memory, the memory storing at least one instruction, at least one program, a code set or an instruction set, the at least one instruction, the at least one program, the code set or the instruction set being loaded and executed by the processor to implement the method for determining an implantation location of recommendation information according to the foregoing aspects.

According to another aspect of this application, a non-transitory computer-readable storage medium is provided, storing at least one instruction, at least one program, a code set or an instruction set, the at least one instruction, the at least one program, the code set or the instruction set being loaded and executed by a processor to implement the method for determining an implantation location of recommendation information according to the foregoing aspects.

According to another aspect of this application, a computer program product is provided, the computer program product including computer instructions, the computer instructions being stored in a computer-readable storage medium. A processor of a computer device reads the computer instructions from the computer-readable storage medium, and the processor executes the computer instructions, so that the computer device performs and implements the method for determining an implantation location of recommendation information according to the foregoing aspects.

Beneficial effects brought by the technical solutions provided in the embodiments of this application are at least as follows:

The target video frame is obtained from the target video, and image recognition processing is performed on the target video frame to obtain the masking information of the target video frame, so as to determine the implantation location of the recommendation information in the target video frame on the basis of the first region corresponding to the object of the target type in the target video frame, thereby implementing a process of automatically implanting the recommendation information in a form of video-in in the target video, reducing a workload of the implantation process of the recommendation information, improving implantation efficiency of the recommendation information, and saving time resources and human resources.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

Figure 1:
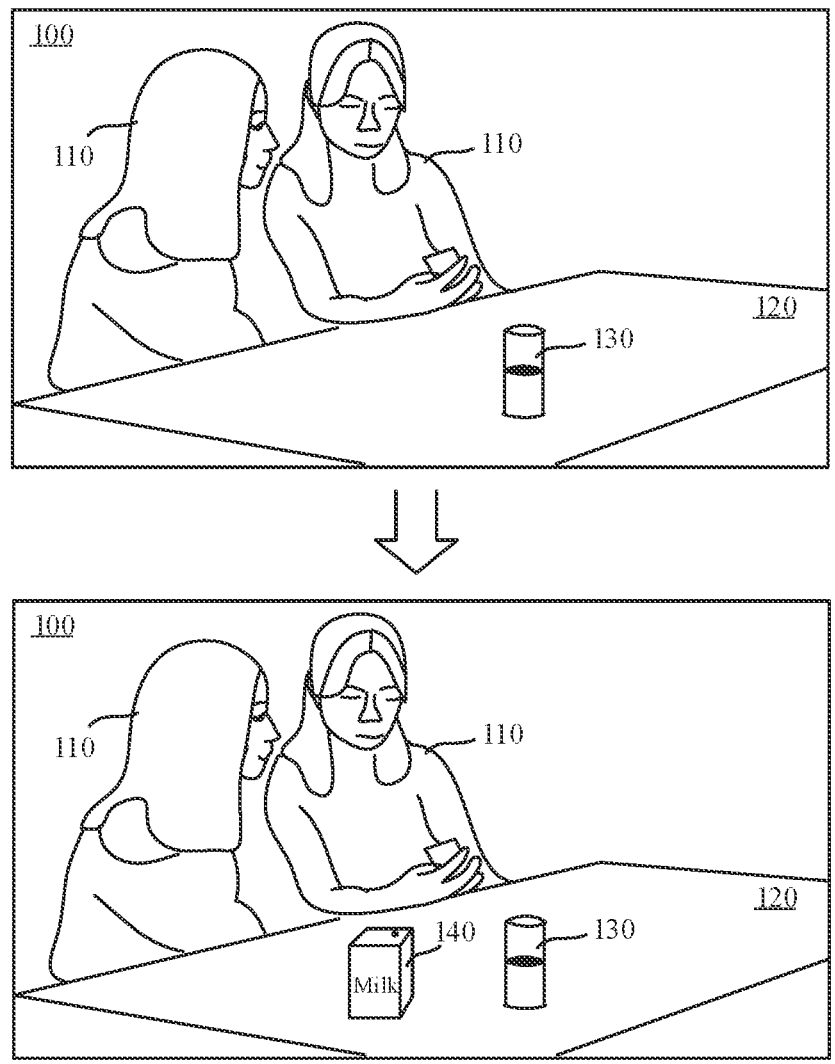
FIG. 1 is a schematic diagram of a recommendation information implantation effect according to an exemplary embodiment of this application.

To make the objectives, technical solutions, and advantages of this application clearer, implementations of this application are further described below in detail with reference to the accompanying drawings.

First, terms described in the embodiments of this application are briefly introduced.

Masking is a manner in which a selection is made on a layout region by covering the layout region. In some embodiments, the selection manner may be a forward selection manner through masking, or may be a backward selection manner through masking, that is, a covered region may be a selected region, or a non-covered region may be a selected region. In some embodiments, a region to be selected is covered by a colored semi-transparent or opaque color region so as to select the region. In some embodiments, coverage is performed for different types of regions by using color regions of different colors, or coverage is performed for regions corresponding to different objects by using color regions of different colors. For example, when an object in an image is displayed through masking for an image recognition result, an obtained image includes an object A, an object B, and an object C. In this case, a red semi-transparent mask is superimposed on a region in which the object A is recognized in the image to indicate a location of the object A in the image, a green semi-transparent mask is superimposed on a region in which the object B is recognized in the image to indicate a location of the object B in the image, and a blue semi-transparent mask is superimposed on a region in which the object C is recognized in the image to indicate a location of the object C in the image.

For example, application scenarios involved in this application include at least the following scenarios:

A server includes a recommendation information implantation module, and recommendation information corresponding to a product a is implanted into a target video by using the server.

First, the server acquires, from the target video, a target video frame on which location detection needs to be performed. The recommendation information implantation module includes an instance segmentation model, and image recognition is performed on the target video frame by using the instance segmentation model, to obtain an object type in the target video frame and a region corresponding to the object type. For example, through recognition performed by using the instance segmentation model, it can be obtained that the target video frame includes: a desktop type in a region b, a role type is in a region c and a region d, a vase type in a region e, and a cup type in a region f. The server determines, according to a recognition result of the instance segmentation model, a location that needs to be implanted with the recommendation information and that is in the region b corresponding to the desktop type, and implants the recommendation information into a scene segment corresponding to the target video frame.

For example, recommendation information corresponding to milk is to be implanted into the target video. After acquiring a three-dimensional model corresponding to the milk, the server acquires a foreground image of the three-dimensional model as the recommendation information. After acquiring the target video, the server segments the target video into a plurality of video segments by scenes. For example, video content of the target video includes the following scenes: A person is eating, a person is talking, a person is walking, and a person is in a meeting, where the scene in which a person is eating includes eating photographed from the front view and eating photographed from the side view. The server acquires an eating video segment photographed from the front view, takes out the first key frame in the video segment as a target video frame, and after image recognition is performed on the target video frame, obtains a desktop region 1, a person region 2, a meal box region 3, a water cup region 4, and an electronic device region 5. After determining an implantation location of the recommendation information based on the desktop region 1, the server implants the foreground image of the three-dimensional model of the milk into the implantation location.

For example, FIG. 1 is a schematic diagram of a recommendation information implantation effect according to an exemplary embodiment of this application. As shown in FIG. 1, a target video frame 100 includes a person 110, a desktop 120, and a water cup 130. After image recognition is performed on the target video frame 100 to obtain a region corresponding to the desktop 120, recommendation information 140, that is, a foreground image of a three-dimensional model of milk, is implanted into the desktop 120.

In some embodiments, in the foregoing exemplary application scenario, that the recommendation information is the recommendation information of the milk is used as an example for description. In an actual operation, the recommendation information may alternatively be recommendation information of products such as coffee, a vase, a mobile phone, and a headset. This is not limited in this embodiment of this application.

In some embodiments, in the foregoing exemplary application scenario, that the recommendation information is the foreground image of the three-dimensional model of the milk is used as an example for description. In an actual operation, the recommendation information may alternatively be implemented as a billboard of a product, label information of a product on another object, and the like. This is not limited in this embodiment of this application.

The foregoing application scenario is only an example. In an actual operation, any application scenario in which the recommendation information implantation module determines the implantation location of the recommendation information may use the method for determining an implantation location of recommendation information provided in this embodiment of this application. This is not limited in this embodiment of this application.

Figure 2:
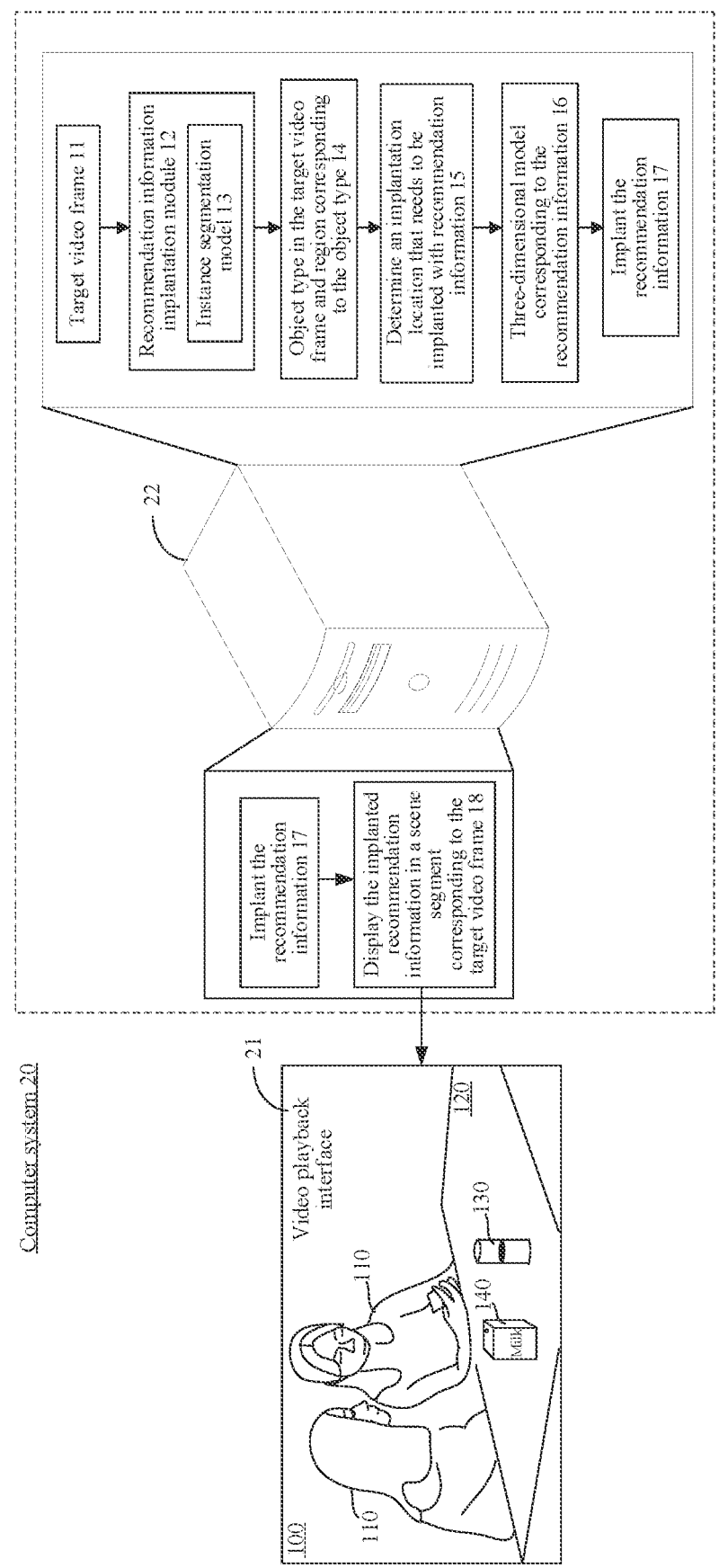
FIG. 2 is a framework diagram of a computer system according to an exemplary embodiment of this application.

FIG. 2 is a block diagram of a computer system according to an exemplary embodiment of this application. The computer system 20 includes a terminal 21 and a server 22.

The terminal 21 and the server 22 are connected to each other by using a wired network or a wireless network.

In some embodiments, the terminal 21 runs an application program. The application program supports a video playback function, and displays a playing video on a video playback interface of the terminal 21. The video includes at least one of a television play, a movie, a variety show, a short video, a video released on a social platform, and a music video (MV).

In some embodiments, the terminal 21 includes a mobile terminal such as a smartphone, a tablet computer, or a laptop computer, or may be a terminal such as a desktop computer or a projector computer. A type of the terminal is not limited in this embodiment of this application.

The server 22 includes a recommendation information implantation module 12, and the recommendation information implantation module 12 is configured to implant recommendation information corresponding to a product into a target video frame. In some embodiments, the recommendation information implantation module 12 includes an instance segmentation model 13, and the instance segmentation model 13 is configured to segment an object type in the target video frame and a region corresponding to the object type.

In some embodiments, the server 22 is implemented as one server, or is implemented as a server cluster including a group of servers. The server 22 is implemented as a physical server, or is implemented as a cloud server. In one implementation, the server 22 is a backend server of the application program in the terminal 21.

As shown in FIG. 2, the server acquires a target video frame 11, and inputs the target video frame 11 to the recommendation information implantation module 12. The recommendation information implantation module includes the instance segmentation model 13, and outputs an object type in the target video frame and a region 14 corresponding to the object type. For example, through recognition performed by the instance segmentation model 13, it is obtained that the target video frame includes: An object of a desktop type is in a region b, an object of a role type is in a region c and a region d, an object of a vase type is in a region e, and an object of a cup type is in a region f. According to a recognition result of the instance segmentation model 13, an implantation location 15 that needs to be implanted with recommendation information is determined in the region b corresponding to the desktop type. The server 22 acquires a three-dimensional model 16 corresponding to the recommendation information. For example, the server 22 acquires a three-dimensional model 140 of a milk product. The server 22 implants recommendation information 17 according to the implantation location 15 that needs to be implanted with recommendation information, for example, implants the three-dimensional model 140 of the milk product into the implantation location 15.

After the recommendation information 17 is implanted into the implantation location, a video playback interface is displayed on the terminal 21, a video being played is displayed on the video playback interface, and the implanted recommendation information is displayed on the region corresponding to the desktop 120 in the video, that is, a foreground image of the three-dimensional model 140 of the milk product is implanted into the region corresponding to the desktop 120.

Figure 3:
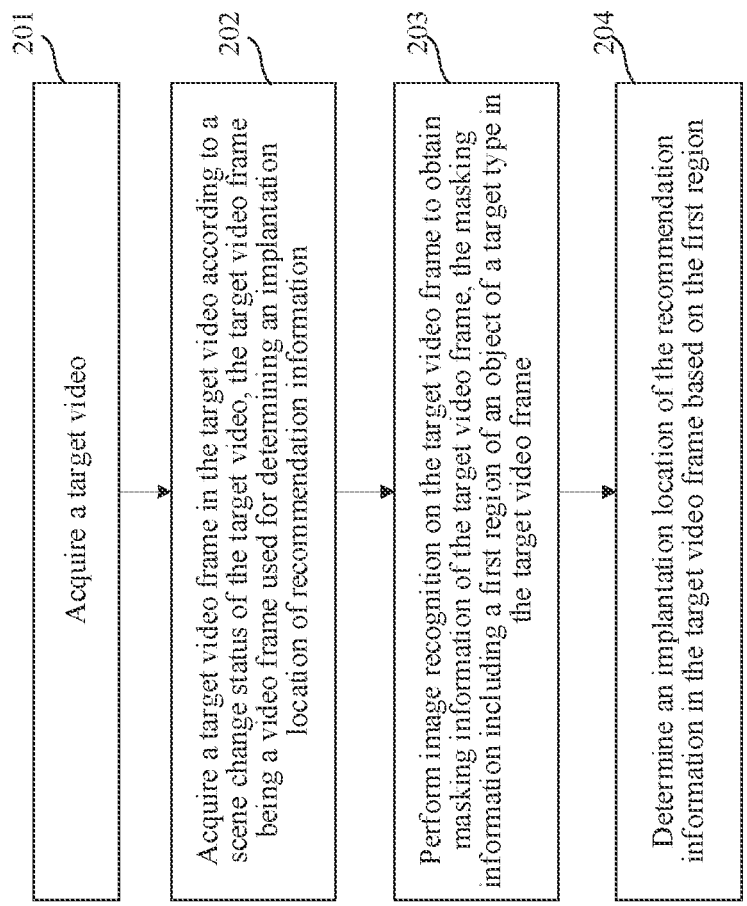
FIG. 3 is a flowchart of a method for determining an implantation location of recommendation information according to an exemplary embodiment of this application.

FIG. 3 is a flowchart of a method for determining an implantation location of recommendation information according to an exemplary embodiment of this application. For example, the method is applied to a computer device.

The computer device may be the server 22 shown in FIG. 2. As shown in FIG. 3, the method includes the following steps:

Step 201. Acquire a target video.

In some embodiments, the target video is a video to be implanted with recommendation information.

In some embodiments, the target video is a video stored in the server, or the target video is a video sent by a terminal and received by the server.

In some embodiments, the target video includes at least one of a television play, a movie, a variety show, a short video, a video released on a social platform, and an MV.

Step 202: Acquire a target video frame in the target video according to a scene change status of the target video, the target video frame being a video frame used for determining an implantation location of the recommendation information.

In some embodiments, a manner of acquiring the target video frame in the target video according to the scene change status includes at least one of the following manners:

First, perform detection on a scene of the target video, and perform video segmentation on the target video according to the scene change status, to obtain a video segment corresponding to the scene change status; and acquire a key frame in the video segment as the target video frame.

In some embodiments, the target video frame may be a first key frame in the video segment, or may be all key frames in the target video segment. This is not limited in this embodiment of this application. In some embodiments, the target video frame is used for determining an implantation location of the recommendation information in the video segment corresponding to the foregoing scene change status.

In some embodiments, the scene change status is determined according to a similarity between at least one group of video frames in the target video. In some embodiments, the scene change status may be determined according to a similarity between two adjacent video frames in the target video, that is, each group of video frames in the at least one group of video frames includes two adjacent frames in the target video. Alternatively, the scene change status may be determined according to a similarity between video frames at an interval of a preset quantity of frames, that is, each group of video frames in the at least one group of video frames includes two video frames at an interval of a preset quantity of frames. In some embodiments, when the similarity between the at least one group of video frames is less than a preset similarity, a video frame with an earlier timestamp is in the group of video frames corresponds to a previous scene of a current scene, and a video frame with a later timestamp is in the group of video frames corresponds to the current scene. For example, if it is determined that a similarity between an ith video frame and an (i+1)th video frame in the target video is less than the preset similarity, the ith video frame corresponds to a kth scene, that is, corresponds to a kth video segment, and the (i+1)th video frame corresponds to a (k+1)th scene, that is, corresponds to a (k+1)th video segment.

In some embodiments, in the video segmentation process, a rule of segmenting the video is implemented based on a shot segmentation algorithm.

In some embodiments, when video segmentation is performed on the target video according to the scene change status, video segmentation is performed on the target video according to a scene change degree, for example, a video segment obtained in current segmentation is an ith video segment. When a scene change degree is relatively large, a current video frame is used as the first video frame of an (i+1)th video segment, and i is a positive integer.

For example, after detection on the scene of the target video is performed, the target video is segmented to obtain k video segments according to the scene change status, and the first key frame of each of the k video segments is used as the target video frame, that is, a total of k target video frames, and k is a positive integer.

Second, perform detection on a scene of the target video, and use a video frame with a relatively large change degree as the target video frame according to a change degree of the scene change status.

In some embodiments, scene change degree detection is continuously performed on consecutive video frames in the target video, and when a scene change degree between two detected video frames is relatively large, a video frame with a later timestamp is used as the target video frame. Two adjacent video frames may be detected in the detection process, for example, a scene change degree between the ith video frame and the (i+1)th video frame is detected, or two video frames at an interval of a preset quantity of frames is detected. For example, when the preset quantity is n, a scene change degree between the ith video frame and an (i+n)th video frame is detected, where n is a positive integer.

Step 203: Perform image recognition on the target video frame to obtain masking information of the target video frame, the masking information including a first region of an object of a target type in the target video frame.

In some embodiments, the masking information is used for indicating a region corresponding to an object in the target video frame. In some embodiments, the masking information includes regions corresponding to at least two types of objects in the target video frame, and the regions include the first region corresponding to the object of the target type in the target video frame.

In some embodiments, the server includes an instance segmentation model, and the instance segmentation model is a model obtained by training sample images marked with object categories. After the target video frame is inputted into the instance segmentation model, the instance segmentation model recognizes image content in the target video frame, and outputs a category of an object recognized from the target video frame and a region occupied by the object in the target video frame.

In some embodiments, the instance segmentation model is a mask region-based convolutional neural network (R-CNN) model based on an instance segmentation algorithm.

In some embodiments, after the instance segmentation model performs recognition on the target video frame, a masking result set for the target video frame may further be obtained, where the masking result set includes an object category, an object region, and a confidence level that are of each recognized object, and the confidence level is used for indicating prediction accuracy of a recognition result (the object category and the object region) of the object. In some embodiments, after a result with a confidence level less than a required confidence level in the masking result set is removed, a filtered masking result set is obtained as masking information, that is, an object recognition result whose confidence level meets the required confidence level is reserved as masking information of the target video frame.

In some embodiments, the target type includes at least one of a desktop type, a ground type, a sill type, and a counter type.

Step 204: Determine an implantation location of the recommendation information in the target video frame based on the first region.

In some embodiments, when the first region is a region in which at least one plane of a desktop, a ground, a sill, and a counter is located, the implantation location of the recommendation information is determined by a location at which another object on the plane is shielded.

In some embodiments, it is determined from the masking information that a connected target sub-region with respect to the first region exists, and a location of the target sub-region is determined as the implantation location of the recommendation information in the target video frame.

In some embodiments, a target sub-region connected to the first region refers to a sub-region surrounded or semi-surrounded by the first region. When the target sub-region is surrounded by the first region, that is, an object corresponding to the target sub-region is placed on a plane corresponding to the first region (for example, a mobile phone is placed on a desktop), and a placement range of the object corresponding to the target sub-region is in the plane corresponding to the first region, and a display range of the object is within a range of the first region. When the target sub-region is semi-surrounded by the first region, that is, the object corresponding to the target sub-region is placed on the plane corresponding to the first region, and the display range of the object corresponding to the target sub-region exceeds the range of the first region (for example, a water bottle that is on the desktop and that is photographed from an oblique top view, and a part of the water bottle exceeds a display range of the desktop).

In some embodiments, when the location of the target sub-region is determined as the implantation location of the recommendation information, any point on a side or a contour of the target sub-region may be used as a reference for the implantation location of the recommendation information. For example, when a lower edge of the target sub-region located in the target video frame is used as a reference, during implantation of the recommendation information, a region obtained after a lower edge of the region corresponding to the recommendation information is aligned with the lower edge of the target sub-region is the implantation location of the recommendation information. When a point on the lower edge of the target sub-region located in the target video frame is used as a reference, during implantation of the recommendation information, a region obtained after a point on the lower edge of the region corresponding to the recommendation information is aligned with a point on the lower edge of the target sub-region is the implantation location of the recommendation information.

In some embodiments, the target sub-region is a region corresponding to an object of a non-role type. In some embodiments, when a plurality of target sub-regions in the target video frame are connected to the first region, the following selection manners of the target sub-regions are included:

First, select a location of any target sub-region from the target sub-regions as the implantation location of the recommendation information.

Second, select a target sub-region with the smallest region area from the plurality of target sub-regions, and use a location of the target sub-region as the implantation location of the recommendation information.

Third, further recognizes a central role from the target video frame, determines a target sub-region according to distances between the plurality of target sub-regions and the central role, and uses a location of the target sub-region as the implantation location of the recommendation information.

Figure 4:
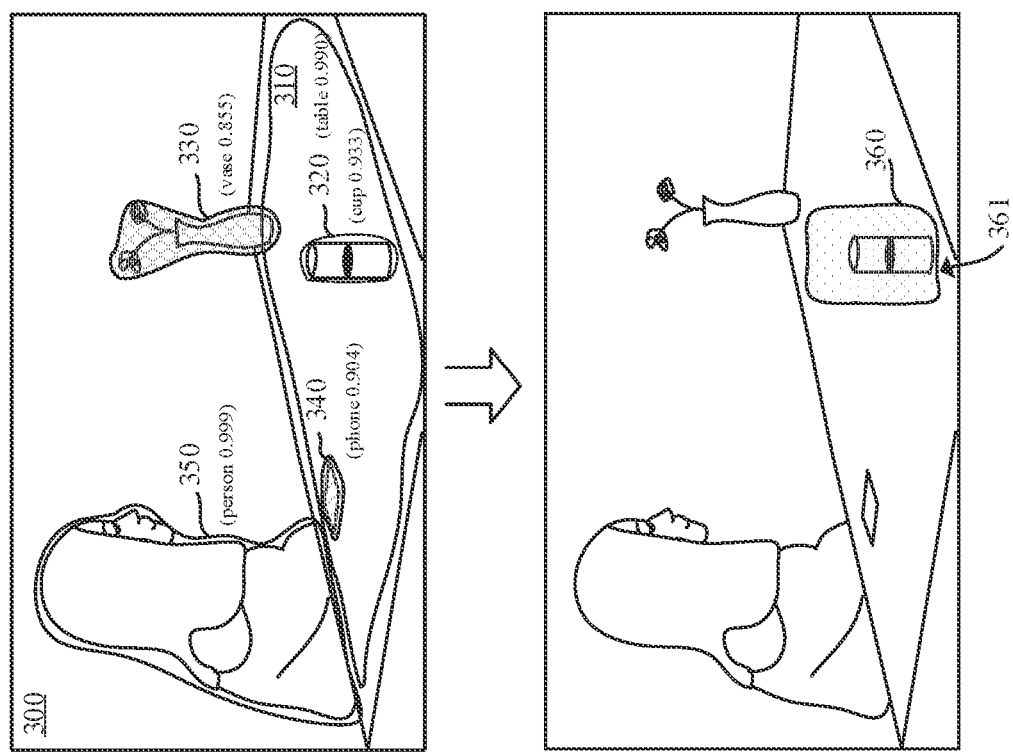
FIG. 4 is a schematic process diagram of determining an implantation location of recommendation information according to masking information according to the embodiment shown in FIG. 3.

For example, referring to FIG. 4, after image recognition is performed on an image 300, an object type, an object region, and a confidence level in the image 300 are obtained, and a required confidence level is 0.5. Therefore, an image recognition result that does not meet the required confidence level is removed, and masking information that meets the required confidence level is reserved and includes: a desktop region 310 (confidence level 0.990), a water cup region 320 (confidence level 0.933), a vase region 330 (confidence level 0.855), a mobile phone region 340 (confidence level 0.904), and a person region 350 (confidence level 0.999). The water cup region 320, the vase region 330, and the mobile phone region 340 are target sub-regions connected to the desktop region 310, and it is determined from the masking information by using the foregoing method for selecting the target sub-region that the location of the water cup region 320 is the implantation location of the recommendation information. A lower edge 361 of the water cup region 320 is used as a lower edge of an implantation region 360 of the recommendation information. A region obtained after the lower edge of the implantation region 360 of the recommendation information is aligned with the lower edge 361 is the implantation region of the recommendation information.

In conclusion, according to the method for determining an implantation location of recommendation information provided in this embodiment, the target video frame is obtained from the target video, and image recognition processing is performed on the target video frame to obtain the masking information of the target video frame, so as to determine the implantation location of the recommendation information in the target video frame on the basis of the first region corresponding to the object of the target type in the target video frame, thereby implementing a process of automatically implanting the recommendation information in a form of video-in in the target video, reducing a workload of the implantation process of the recommendation information, improving implantation efficiency of the recommendation information, and saving time resources and human resources.

Figure 5:
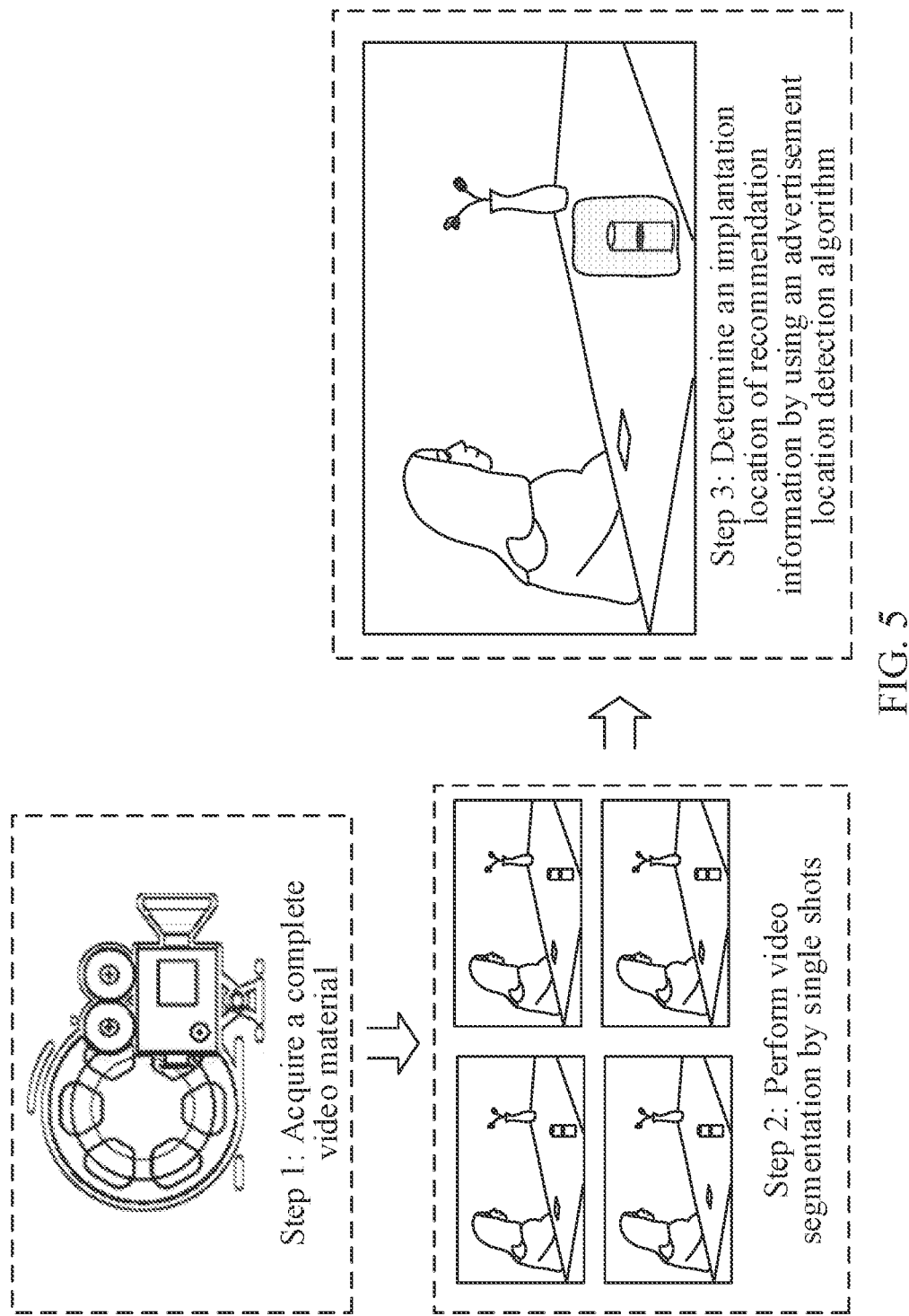
FIG. 5 is a schematic process diagram of a method for determining an implantation location of recommendation information according to an exemplary embodiment of this application.

For example, referring to FIG. 5, which is a schematic process diagram of a method for determining an implantation location of recommendation information according to an exemplary embodiment of this application. As shown in FIG. 5, the method for determining an implantation location of recommendation information is divided into three steps:

Step 1: Acquire a complete video material.

Step 2: Perform video segmentation by single shots.

In some embodiments, video segmentation is performed on the video material according to a video scene, the video material is segmented into video segments based on a scene change, and a target video frame is obtained from the video segment as a video frame for location detection.

Step 3: Determine an implantation location of recommendation information by using an advertisement location detection algorithm.

In some embodiments, instance detection is first performed on the target video frame by using an instance segmentation-based mask R-CNN model, and the implantation location of the recommendation information is determined from a detection result.

Figure 6:
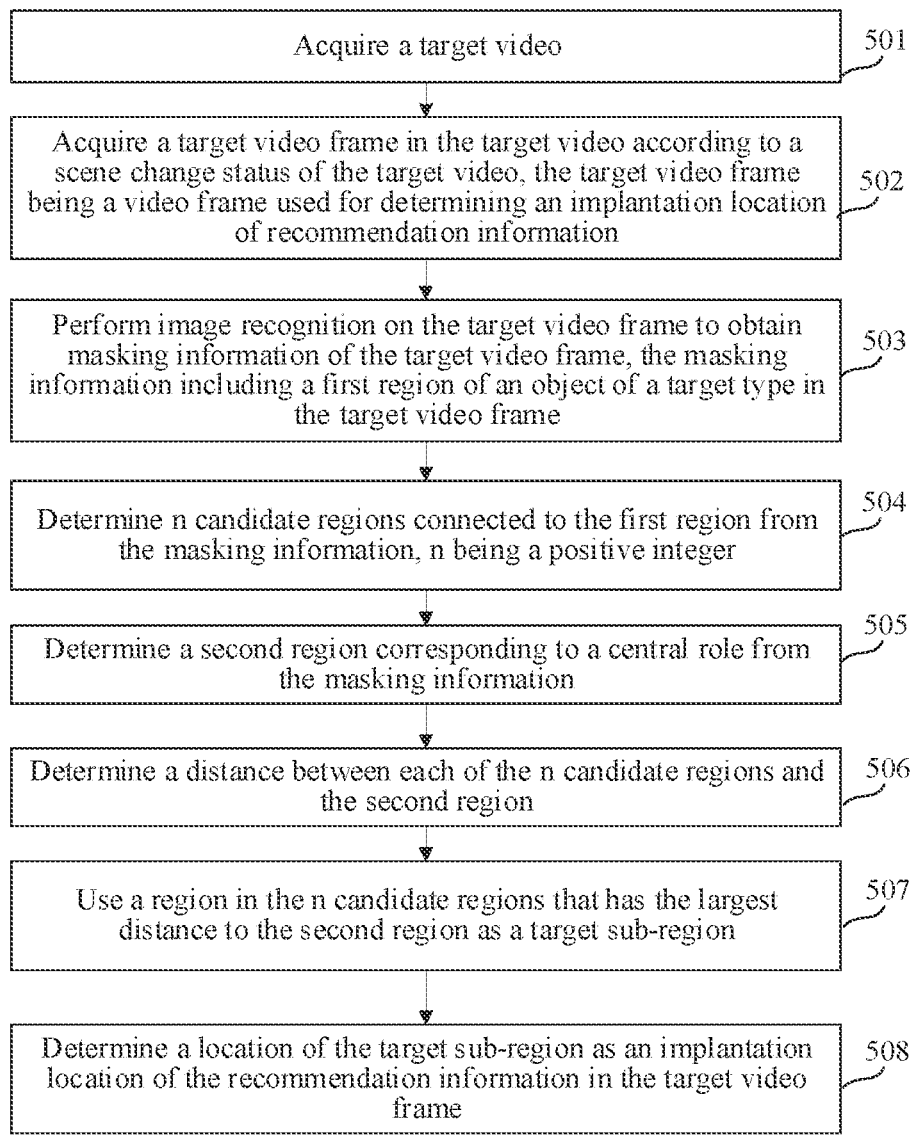
FIG. 6 is a flowchart of a method for determining an implantation location of recommendation information according to an exemplary embodiment of this application.

In some embodiments, the foregoing target sub-region is determined according to a location relationship between a candidate region connected to the first region and a central role. FIG. 6 is a flowchart of a method for determining an implantation location of recommendation information according to another exemplary embodiment of this application. For example, the method is applied to a server. As shown in FIG. 6, the method includes the following steps:

Step 501. Acquire a target video.

In some embodiments, the target video is a video to be implanted with recommendation information.

In some embodiments, the target video includes at least one of a television play, a movie, a variety show, a short video, a video released on a social platform, and an MV.

Step 502: Acquire a target video frame in the target video according to a scene change status of the target video, the target video frame being a video frame used for determining an implantation location of the recommendation information.

In some embodiments, the scene change status is determined according to a similarity between at least one group of video frames in the target video.

In some embodiments, a manner of acquiring the target video frame in the target video according to the scene change status includes at least one of the following manners:

First, perform detection on a scene of the target video, and perform video segmentation on the target video according to the scene change status, to obtain a video segment corresponding to the scene change status; and acquire a key frame in the video segment as the target video frame.

Second, perform detection on a scene of the target video, and use a video frame with a relatively large change degree as the target video frame according to a change degree of the scene change status.

Step 503: Perform image recognition on the target video frame to obtain masking information of the target video frame, the masking information including a first region of an object of a target type in the target video frame.

In some embodiments, the masking information is used for indicating a region corresponding to an object in the target video frame. In some embodiments, the masking information includes regions corresponding to at least two types of objects in the target video frame, and the regions include the first region of the object of the target type in the target video frame.

In some embodiments, after the instance segmentation model performs recognition on the target video frame, a masking result set for the target video frame may further be obtained, where the masking result set includes an object category, an object region, and a confidence level that are of each recognized object, and the confidence level is used for indicating prediction accuracy of a recognition result (the object category and the object region) of the object. In some embodiments, after a result with a confidence level less than a required confidence level in the masking result set is removed, a filtered masking result set is obtained as masking information, that is, an object recognition result whose confidence level meets the required confidence level is reserved as masking information of the target video frame.

In some embodiments, the target type includes at least one of a desktop type, a ground type, a sill type, and a counter type.

Step 504: Determine n candidate regions connected to the first region from the masking information, n being a positive integer.

In some embodiments, a target sub-region connected to the first region refers to a sub-region surrounded or semi-surrounded by the first region. When the target sub-region is surrounded by the first region, that is, an object corresponding to the target sub-region is placed on a plane corresponding to the first region, and a display range of the object is within a range of the first region (for example, a mobile phone placed on a desktop). When the target sub-region is semi-surrounded by the first region, that is, the object corresponding to the target sub-region is placed on the plane corresponding to the first region, and the display range of the object corresponding to the target sub-region exceeds the range of the first region (for example, a water bottle that is on the desktop and that is photographed from an oblique top view, and a part of the water bottle exceeds a display range of the desktop). That is, n candidate regions connected to the first region are display regions of n objects placed on the plane corresponding to the first region.

In some embodiments, for example, the first region is a region corresponding to the desktop. When n objects are placed on the desktop, the masking information includes n candidate regions connected to the first region, such as a mobile phone region, a water cup region, and a vase region.

In some embodiments, when the target video frame includes at least two objects of the target type, and the first region includes at least two candidate sub-regions corresponding to the objects of the target type, after filtering is first performed on the first region, n candidate regions connected to the filtered first region need to be determined from the masking information. In some embodiments, a candidate sub-region with the largest area in the at least two candidate sub-regions is reserved as the filtered first region, and other candidate sub-regions are deleted, so as to implement filtering on the first region.

Figure 7:
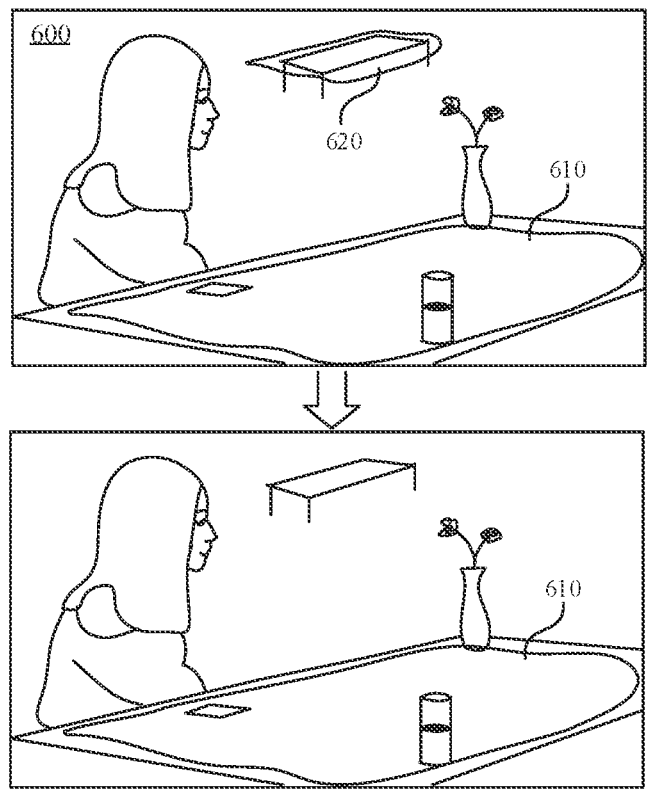
FIG. 7 is a schematic diagram of a filtering process of a first region according to the embodiment shown in FIG. 6.

For example, FIG. 7 is a schematic diagram of a filtering process of a first region according to an exemplary embodiment of this application. As shown in FIG. 7, a mask corresponding to a desktop type is obtained through recognition on an image 600: a candidate sub-region 610 and a candidate sub-region 620. After a region area of the candidate sub-region 610 is compared with a region area of the candidate sub-region 620, the candidate sub-region 610 is reserved as the filtered first region.

Step 505: Determine a second region corresponding to a central role from the masking information.

In some embodiments, when the masking information includes a region corresponding to only one role type, the region corresponding to the role type is used as the second region corresponding to the central role. When the masking information includes a plurality of role regions, m role regions corresponding to a role type are determined from the masking information, where m is a positive integer; and a role region with the largest region area in the m role regions is used as the second region corresponding to the central role, that is, the role region with the largest area is a region corresponding to the central role in the target video frame.

Figure 8:
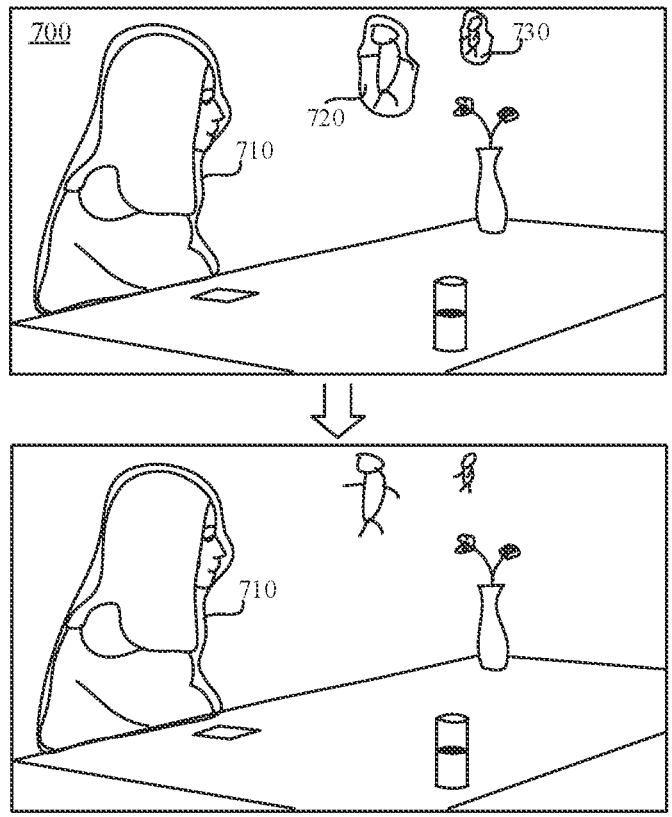
FIG. 8 is a schematic diagram of a determining process of a central role according to the embodiment shown in FIG. 6.

For example, FIG. 8 is a schematic diagram of a determining process of a central role according to an exemplary embodiment of this application. As shown in FIG. 8, a role region 710, a role region 720, and a role region 730 that correspond to a role type are recognized in an image 700. By comparing region areas of the role region 710, the role region 720, and the role region 730, the role region 710 with the largest area in the role region 710, the role region 720, and the role region 730 is reserved as the second region corresponding to the central role.

Step 506: Determine a distance between each of the n candidate regions and the second region.

In some embodiments, the distance between the candidate region and the second region may be determined by a distance between left edges of the regions, may be determined by a distance between right edges of the regions, may be determined by a distance between upper edges of the regions, may be determined by a distance between lower edges of the regions, or may be determined by a distance between center points of the regions. This is not limited in this embodiment of this application.

In some embodiments, the distance between the candidate region and the second region may be calculated in a manner such as a Euclidean distance algorithm, a Mahalanobis distance algorithm, a cosine distance algorithm, a Hamming distance algorithm, a Manhattan distance algorithm, and the like. This is not limited in this embodiment of this application.

Step 507: Use a region in the n candidate regions that has the largest distance to the second region as the target sub-region.

Step 508: Determine a location of the target sub-region as the implantation location of the recommendation information in the target video frame.

In some embodiments, the recommendation information is implanted in a manner of covering the target sub-region. Therefore, after the region area of the target sub-region is multiplied by a preset multiple as a target area of the recommendation information displayed in the target video frame, a target region corresponding to the recommendation information in the target video frame is determined according to the target area and a display shape of the recommendation information, and a location at which the target region covers the target sub-region is used as the implantation location of the recommendation information in the target video frame.

Figure 9:
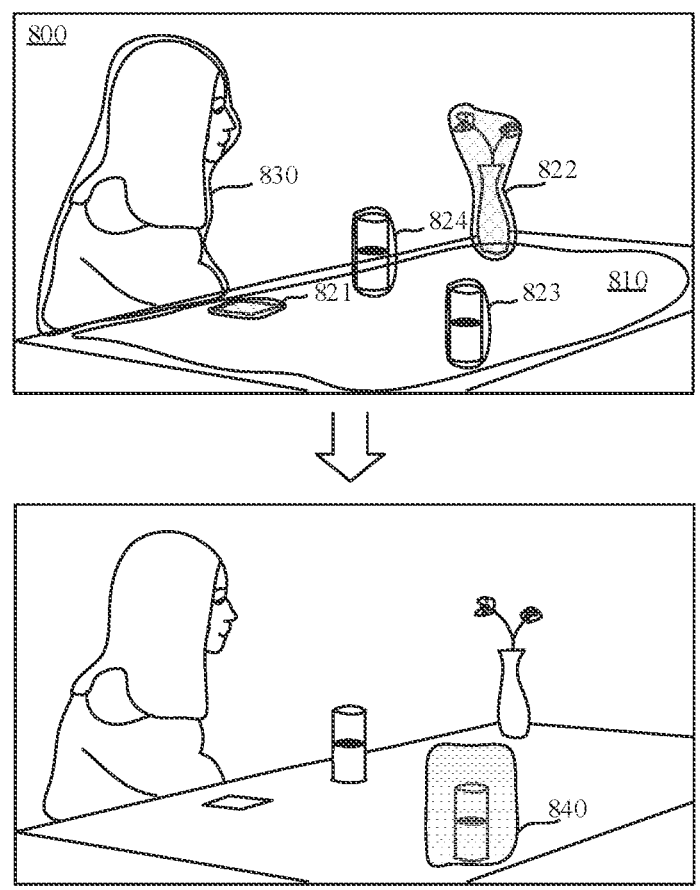
FIG. 9 is a schematic diagram of a process of determining an implantation location of recommendation information based on the embodiment shown in FIG. 6.

For example, FIG. 9 is a schematic diagram of a process of determining an implantation location of recommendation information according to an exemplary embodiment of this application. As shown in FIG. 9, after a first region 810 corresponding to a desktop is recognized in an image 800, a candidate region 821, a candidate region 822, a candidate region 823, and a candidate region 824 that are connected to the first region 810 are separated, a second region 830 corresponding to a central role is determined, the candidate region 823 farthest away from the second region 830 is determined as a target sub-region, and an implantation region 840 whose region area is four times an area of the candidate region 823 is set in the target sub-region.

In conclusion, according to the method for determining an implantation location of recommendation information provided in this embodiment, the target video frame is obtained from the target video, and image recognition processing is performed on the target video frame to obtain the masking information of the target video frame, so as to determine the implantation location of the recommendation information in the target video frame on the basis of the first region corresponding to the object of the target type in the target video frame, thereby implementing a process of automatically implanting the recommendation information in a form of video-in in the target video, reducing a workload of the implantation process of the recommendation information, improving implantation efficiency of the recommendation information, and saving time resources and human resources.

According to the method provided in this embodiment, a candidate region that is in candidate regions connected to the first region and that is farthest from the central role is selected as the target sub-region, and the location of the target sub-region is used as the implantation location of recommendation information, thereby avoiding a problem that implantation of the recommendation information shields performance of the central role, which affects normal displaying of video content.

Figure 10:
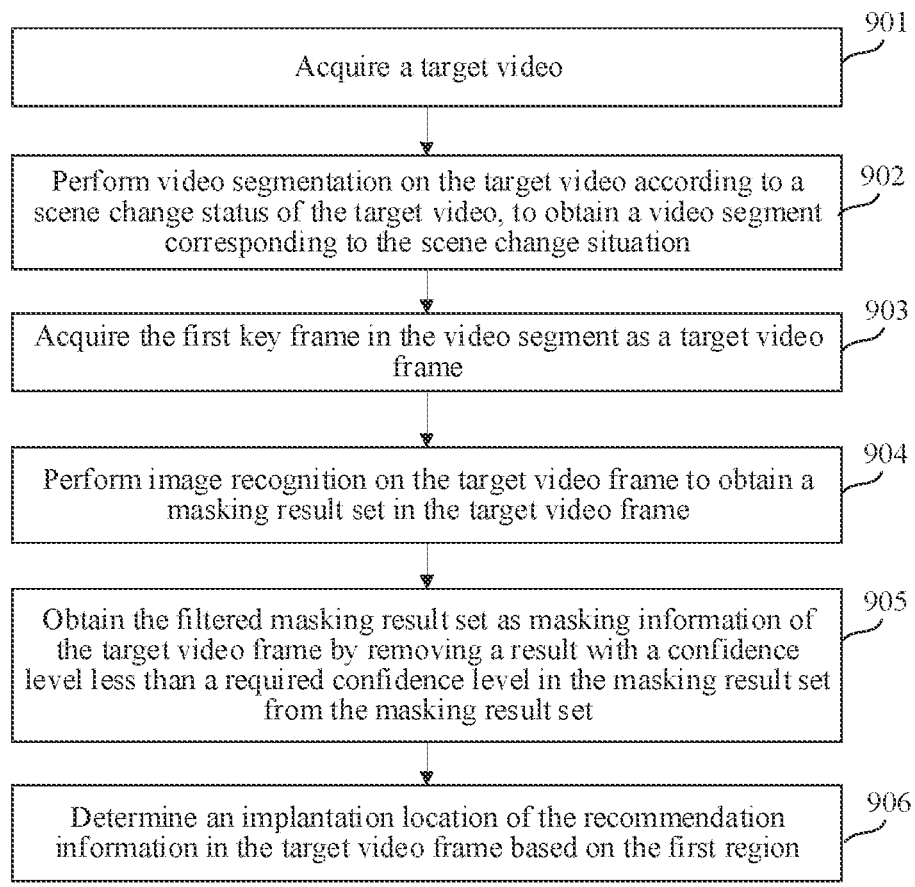
FIG. 10 is a flowchart of a method for determining an implantation location of recommendation information according to an exemplary embodiment of this application.

In some embodiments, the foregoing target video frame is obtained by performing video fragmentation. In some embodiments, the foregoing masking information is obtained by performing filtering using the confidence level. FIG. 10 is a flowchart of a method for determining an implantation location of recommendation information according to another exemplary embodiment of this application. As shown in FIG. 10, the method includes the following steps:

Step 901. Acquire a target video.

In some embodiments, the target video is a video to be implanted with recommendation information.

In some embodiments, the target video includes at least one of a television play, a movie, a variety show, a short video, a video released on a social platform, and an MV.

Step 902: Perform video segmentation on the target video according to a scene change status of the target video, to obtain a video segment corresponding to the scene change status.

In some embodiments, in the video segmentation process, a rule of segmenting the video is implemented based on a shot segmentation algorithm.

In some embodiments, when video segmentation is performed on the target video according to the scene change status, video segmentation is performed on the target video according to a scene change degree, for example, a video segment obtained in current segmentation is an ith video segment. When a scene change degree is relatively large, a current video frame is used as the first video frame of an (i+1)th video segment, and i is a positive integer.

Step 903: Acquire the first key frame in the video segment as a target video frame.

Step 904: Perform image recognition on the target video frame to obtain a masking result set in the target video frame.

The masking result set includes an object category, an object region, and a confidence level that are of each recognized object, where the confidence level is used for indicating prediction accuracy of a recognition result (the object category and the object region) of the object.

Step 905: Obtain the filtered masking result set as masking information of the target video frame by removing a result with a confidence level less than a required confidence level in the masking result set from the masking result set.

In some embodiments, the masking information is used for indicating a region corresponding to an object in the target video frame, and the region includes a first region of an object of a target type in the target video frame.

Step 906: Determine an implantation location of the recommendation information in the target video frame based on the first region.

In some embodiments, when the first region is a region in which at least one plane of a desktop, a ground, a sill, and a counter is located, the implantation location of the recommendation information is determined by a location at which another object on the plane is shielded.

In some embodiments, it is determined from the masking information that a connected target sub-region with respect to the first region exists, and a location of the target sub-region is determined as the implantation location of the recommendation information in the target video frame.

In some embodiments, the target sub-region connected to the first region refers to a sub-region surrounded or semi-surrounded by the first region.

In some embodiments, when the location of the target sub-region is determined as the implantation location of the recommendation information, any point on a side or a contour of the target sub-region may be used as a reference for the implantation location of the recommendation information.

In some embodiments, the target sub-region is a region corresponding to an object of a non-role type. In some embodiments, when a plurality of target sub-regions in the target video frame are connected to the first region, the following selection manners of the target sub-regions are included:

First, select a location of any target sub-region from the target sub-regions as the implantation location of the recommendation information.

Second, select a target sub-region with the smallest region area from the plurality of target sub-regions, and use a location of the target sub-region as the implantation location of the recommendation information.

Third, further recognizes a central role from the target video frame, determines a target sub-region according to distances between the plurality of target sub-regions and the central role, and uses a location of the target sub-region as the implantation location of the recommendation information.

In conclusion, according to the method for determining an implantation location of recommendation information provided in this embodiment, the target video frame is obtained from the target video, and image recognition processing is performed on the target video frame to obtain the masking information of the target video frame, so as to determine the implantation location of the recommendation information in the target video frame on the basis of the first region corresponding to the object of the target type in the target video frame, thereby implementing a process of automatically implanting the recommendation information in a form of video-in in the target video, reducing a workload of the implantation process of the recommendation information, improving implantation efficiency of the recommendation information, and saving time resources and human resources.

According to the method provided in this embodiment, a result with a relatively low confidence level is filtered out from the masking result set, and a result with a confidence level meeting the confidence requirement is reserved, so as to obtain the masking information, thereby ensuring recognition accuracy of subsequent regions such as the first region and the second region, and accuracy of the implantation location of the recommendation information.

Figure 11:
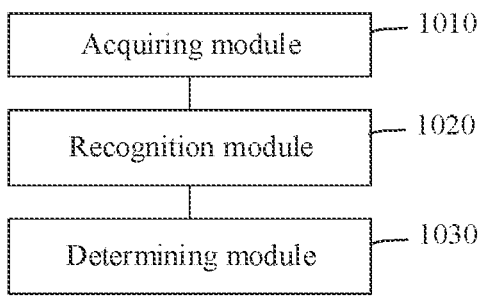
FIG. 11 is a structural block diagram of an apparatus for determining an implantation location of recommendation information according to an exemplary embodiment of this application.

FIG. 11 is a structural block diagram of an apparatus for determining an implantation location of recommendation information according to an exemplary embodiment of this application. For example, the apparatus for determining an implantation location of recommendation information is applied to a server. As shown in FIG. 11, the apparatus includes an acquiring module 1010, a recognition module 1020, and a determining module 1030.

The acquiring module 1010 is configured to acquire a target video, the target video being a video to be implanted with recommendation information;

the acquiring module 1010 is further configured to acquire a target video frame in the target video according to a scene change status of the target video, the target video frame being a video frame used for determining an implantation location of the recommendation information, and the scene change status being determined according to a similarity between at least one group of video frames in the target video;

the recognition module 1020 is configured to perform image recognition on the target video frame to obtain masking information of the target video frame, the masking information including regions corresponding to at least two types of objects in the target video frame, the regions including a first region corresponding to an object of a target type in the target video frame; and the determining module 1030 is configured to determine an implantation location of the recommendation information in the target video frame based on the first region.

In some embodiments, the determining module 1030 is further configured to: determine a target sub-region connected to the first region from the masking information; and determine a location of the target sub-region as the implantation location of the recommendation information in the target video frame.

In some embodiments, the determining module 1030 is further configured to: determine n candidate regions connected to the first region from the masking information, n being a positive integer; determine a second region corresponding to a central role from the masking information; determine a distance between each of the n candidate regions and the second region; and use a region in the n candidate regions that has the largest distance to the second region as the target sub-region.

In some embodiments, the determining module 1030 is further configured to: determine m role regions corresponding to a role type from the masking information, m being a positive integer; and use a role region with the largest region area in the m role regions as the second region corresponding to the central role.

In some embodiments, the determining module 1030 is further configured to: multiply a region area of the target sub-region by a preset multiple as a target area of the recommendation information displayed in the target video frame; determine a target region corresponding to the recommendation information in the target video frame according to the target area and a display shape of the recommendation information; and use a location at which the target region covers the target sub-region as the implantation location of the recommendation information in the target video frame.

In some embodiments, the target video frame includes at least two objects of the target type, and the first region includes at least two candidate sub-regions corresponding to the objects of the target type.

Figure 12:
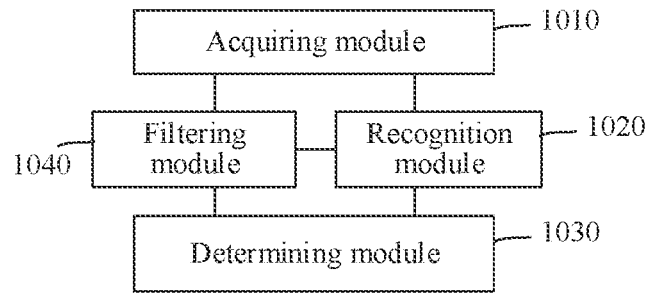
FIG. 12 is a structural block diagram of an apparatus for determining an implantation location of recommendation information according to another exemplary embodiment of this application.

As shown in FIG. 12, the apparatus further includes:

a filtering module 1040, configured to reserve a candidate sub-region with the largest area in the at least two candidate sub-regions as the filtered first region, and delete other candidate sub-regions.

In some embodiments, the acquiring module 1010 is further configured to: perform video segmentation on the target video according to the scene change status of the target video, to obtain a video segment corresponding to the scene change status; and acquire the first key frame in the video segment as the target video frame, the target video frame being a video frame used for determining an implantation location of the recommendation information in the video segment.

In some embodiments, the recognition module 1020 is further configured to perform image recognition on the target video frame to obtain a masking result set in the target video frame, the masking result set including an object category, an object region, and a confidence level that are of each recognize object; and the apparatus further includes:

a filtering module 1040, configured to: obtain the filtered masking result set as the masking information of the target video frame by removing a result with a confidence level less than a required confidence level in the masking result set from the masking result set.

In some embodiments, the target type includes at least one of a desktop type, a ground type, a sill type, and a counter type.

In conclusion, according to the apparatus for determining an implantation location of recommendation information provided in this embodiment, the target video frame is obtained from the target video, and image recognition processing is performed on the target video frame to obtain the masking information of the target video frame, so as to determine the implantation location of the recommendation information in the target video frame on the basis of the first region corresponding to the object of the target type in the target video frame, thereby implementing a process of automatically implanting the recommendation information in a form of video-in in the target video, reducing a workload of the implantation process of the recommendation information, improving implantation efficiency of the recommendation information, and saving time resources and human resources.

The apparatus for determining an implantation location of recommendation information provided in the foregoing embodiments is illustrated with an example of division of the foregoing function modules. In practical application, the foregoing functions may be allocated to and completed by different function modules according to requirements, that is, the internal structure of the apparatus is divided into different function modules, so as to complete all or part of the functions described above. In addition, the apparatus for determining an implantation location of recommendation information provided in the foregoing embodiment belongs to the same conception as the method for determining an implantation location of recommendation information. For a specific implementation process thereof, reference may be made to the method embodiment. Details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

This application further provides a computer device. The computer device includes a processor and a memory. The memory stores at least one instruction. The at least one instruction is loaded and executed by the processor, so as to implement the method for determining an implantation location of recommendation information provided in the foregoing method embodiments. The computer device may be a server provided in FIG. 13 below.

Figure 13:
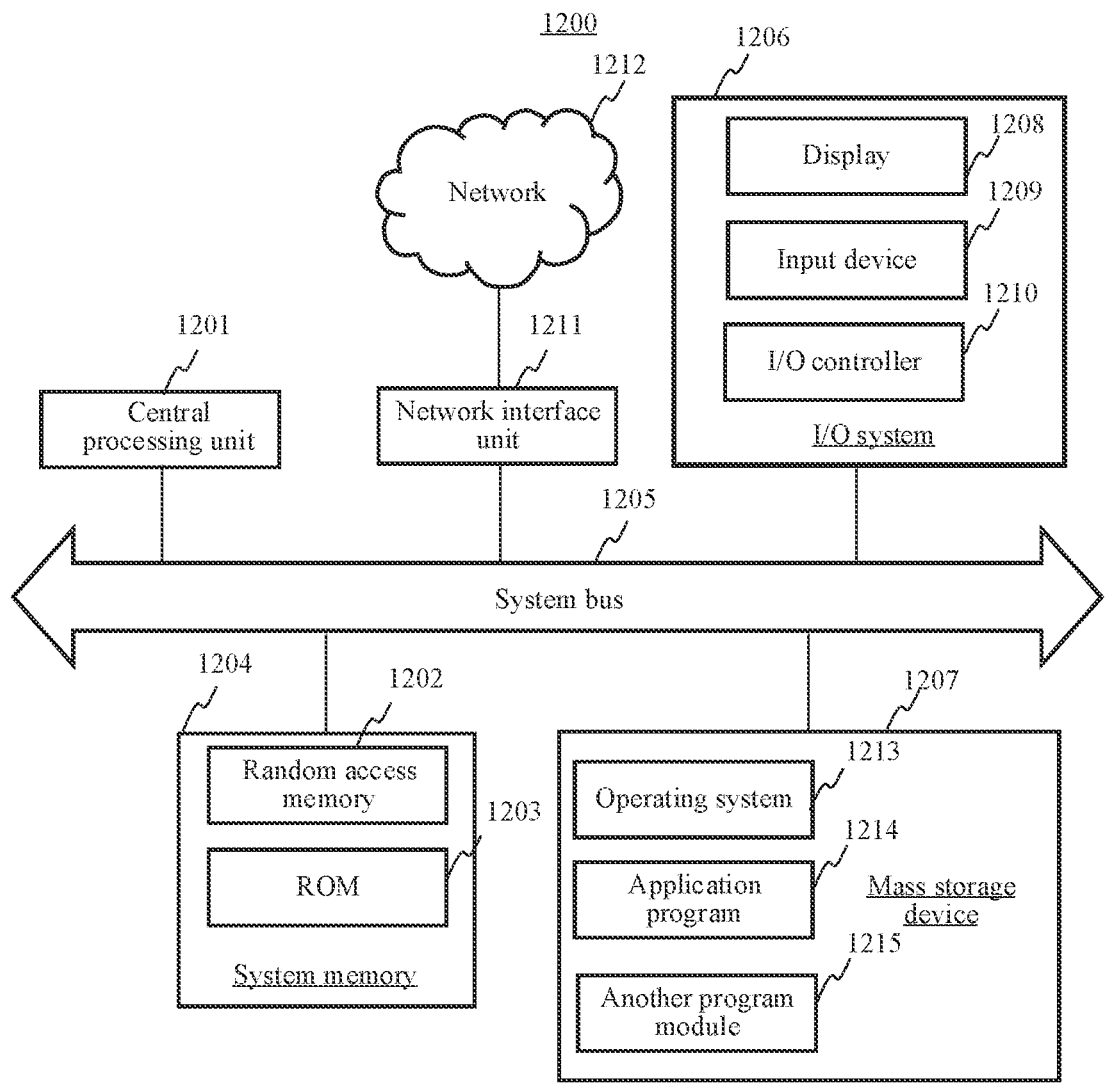
FIG. 13 is a structural block diagram of a server according to an exemplary embodiment of this application.

FIG. 13 is a schematic structural diagram of a server according to an exemplary embodiment of this application. Specifically, the server 1200 includes a central processing unit (CPU) 1201, a system memory 1204 including a random access memory (RAM) 1202 and a read only memory (ROM) 1203, and a system bus 1205 connecting the system memory 1204 to the CPU 1201. The server 1200 further includes a basic input/output (I/O) system 1206 for transmitting information between components in a computer, and a mass storage device 1207 used for storing an operating system 1213, an application program 1214, and another program module 1215.

The basic I/O system 1206 includes a display 1208 configured to display information and an input device 1209 such as a mouse or a keyboard that is used for inputting information by a user. The display 1208 and the input device 1209 are both connected to the CPU 1201 by using an I/O controller 1210 connected to the system bus 1205. The basic I/O system 1206 may further include the I/O controller 1210, to receive and process inputs from a plurality of other devices such as the keyboard, the mouse, or an electronic stylus. Similarly, the I/O controller 1210 further provides an output to a display, a printer or another type of output device.

The large-capacity storage device 1207 is connected to the CPU 1201 by using a large-capacity storage controller (not shown) connected to the system bus 1205. The large-capacity storage device 1207 and an associated computer-readable medium provide non-volatile storage for the server 1200. That is, the mass storage device 1207 may include a computer-readable medium (not shown) such as a hard disk or a compact disc read only memory (CD-ROM) drive.

Without loss of generality, the computer readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may learn that the computer storage medium is not limited to the foregoing several types. The system memory 1204 and the mass storage device 1207 may be collectively referred to as a memory.

The memory stores one or more programs, and the one or more programs are configured to be executed by one or more CPUs 1201. The one or more programs include instructions used for implementing the method for determining an implantation location of recommendation information, and the CPU 1201 executes the one or more programs to implement the method for determining an implantation location of recommendation information provided in the foregoing method embodiments.

According to the embodiments of this invention, the server 1200 may further be connected, by using a network such as the Internet, to a remote computer on the network. That is, the server 1200 may be connected to a network 1212 by using a network interface unit 1211 connected to the system bus 1205, or may be connected to another type of network or a remote computer system (not shown) by using a network interface unit 1211.

The memory further includes one or more programs. The one or more programs are stored in the memory and include instructions to be executed by the server in the method for determining an implantation location of recommendation information provided in the embodiments of the present invention.

An embodiment of this application further provides a computer device. The computer device includes a memory and a processor, the memory storing at least one instruction, at least one program, a code set or an instruction set, the at least one instruction, the at least one program, the code set or the instruction set being loaded by a processor to implement the foregoing method for determining an implantation location of recommendation information.

An embodiment of this application further provides a computer-readable storage medium, storing at least one instruction, at least one program, a code set or an instruction set, the at least one instruction, the at least one program, the code set or the instruction set being loaded and executed by a processor to implement the foregoing method for determining an implantation location of recommendation information.

This application further provides a computer program product, the computer program product, when run on a computer, causing the computer to perform the method for determining an implantation location of recommendation information according to the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set or an instruction set, the at least one instruction, the at least one program, the code set or the instruction set being loaded and executed by a processor to implement the foregoing method for determining an implantation location of recommendation information.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of this application are merely for description purpose, and are not intended to indicate priorities of the embodiments.

A person of ordinary skill in the art may understand that all or some of the steps of the embodiments may be implemented by hardware, or may be implemented by a program instructing related hardware. The program may be stored in a computer-readable storage medium. The storage medium mentioned above may include: a read-only memory, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for implanting recommendation information into a video performed at a computer device, the method comprising:
　　acquiring a target video;
　　identifying a video segment within the target video according to a scene change status of video frames in the target video, the video segment including a target video frame;
　　performing image recognition on the target video frame to obtain a region corresponding to an object in the target video frame that is compatible with the recommendation information; and
　　implanting the recommendation information in the region of the target video frame, further including:
　　　　determining, from the region of the target video frame, a target sub-region related to the target video frame corresponding to a second object that is compatible with both the object in the target video frame and the recommendation information;
　　　　determining, within the target sub-region, an implantation location of the recommendation information in the target video frame; and
　　　　implanting the recommendation information in the target sub-region of the target video frame.

2. The method according to claim 1, wherein the determining, from the region of the target video frame, a target sub-region related to the target video frame corresponding to a second object that is compatible with both the object in the target video frame and the recommendation information comprises:
　　determining n candidate regions related to the target video frame from the region of the target video frame, n being a positive integer;
　　determining a second region corresponding to a central role from the region of the target video frame;
　　determining a distance between each of the n candidate regions and the second region; and
　　using a region in the n candidate regions that has the largest distance to the second region as the target sub-region.

3. The method according to claim 2, wherein the determining a second region corresponding to a central role from the region of the target video frame comprises:
　　determining m role regions corresponding to a role type from the region of the target video frame, m being a positive integer; and
　　using a role region with the largest region area in the m role regions as the second region corresponding to the central role.

4. The method according to claim 1, wherein the determining, within the target sub-region, an implantation location of the recommendation information in the target video frame comprises:
　　multiplying a region area of the target sub-region by a preset multiple as a target area of the recommendation information displayed in the target video frame;
　　determining a target region corresponding to the recommendation information in the target video frame according to the target area and a display shape of the recommendation information; and
　　using a location at which the target region covers the target sub-region as the implantation location of the recommendation information in the target video frame.

5. The method according to claim 1, wherein the region of the target video frame comprises at least two candidate sub-regions corresponding to a target type, and the determining a target sub-region including the target video frame from the region of the target video frame comprises:
　　identifying a candidate sub-region with a largest area corresponding to one of the at least two candidate sub-regions as the target sub-region.

6. The method according to claim 1, wherein the identifying a video segment within the target video according to a scene change status of video frames in the target video comprises:

performing video segmentation on the target video to obtain a video segment corresponding to the scene change status; and acquiring a first key frame in the video segment as the target video frame, the target video frame being a video frame used for determining an implantation location of the recommendation information in the video segment.

7. The method according to claim 1, wherein the performing image recognition on the target video frame to obtain a region corresponding to an object in the target video frame that is compatible with the recommendation information comprises:

performing image recognition on the target video frame to obtain a masking result set in the target video frame, each masking result set comprising an object category, an object region, and a confidence level that are of a recognized object; and removing a masking result with a confidence level less than a required confidence level in the masking result set from the masking result set to obtain the region corresponding to the object in the target video frame.

8. A computer device, comprising a processor and a memory, the memory storing at least one instruction, the at least one instruction, when executed by the processor, causing the computer device to perform a plurality of operations including:

acquiring a target video;

identifying a video segment within the target video according to a scene change status of video frames in the target video, the video segment including a target video frame;

performing image recognition on the target video frame to obtain a region corresponding to an object in the target video frame that is compatible with the recommendation information; and implanting the recommendation information in the region of the target video frame, further including:

determining, from the region of the target video frame, a target sub-region related to the target video frame corresponding to a second object that is compatible with both the object in the target video frame and the recommendation information;

determining, within the target sub-region, an implantation location of the recommendation information in the target video frame; and implanting the recommendation information in the target sub-region of the target video frame.

9. The computer device according to claim 8, wherein the determining, from the region of the target video frame, a target sub-region related to the target video frame corresponding to a second object that is compatible with both the object in the target video frame and the recommendation information comprises:

determining n candidate regions related to the target video frame from the region of the target video frame, n being a positive integer;

determining a second region corresponding to a central role from the region of the target video frame;

determining a distance between each of the n candidate regions and the second region; and using a region in the n candidate regions that has the largest distance to the second region as the target sub-region.

10. The computer device according to claim 9, wherein the determining a second region corresponding to a central role from the region of the target video frame comprises:

determining m role regions corresponding to a role type from the region of the target video frame, m being a positive integer; and using a role region with the largest region area in the m role regions as the second region corresponding to the central role.

11. The computer device according to claim 8, wherein the determining, within the target sub-region, an implantation location of the recommendation information in the target video frame comprises:

multiplying a region area of the target sub-region by a preset multiple as a target area of the recommendation information displayed in the target video frame;

determining a target region corresponding to the recommendation information in the target video frame according to the target area and a display shape of the recommendation information; and using a location at which the target region covers the target sub-region as the implantation location of the recommendation information in the target video frame.

12. The computer device according to claim 8, wherein the region of the target video frame comprises at least two candidate sub-regions corresponding to a target type, and the determining a target sub-region including the target video frame from the region of the target video frame comprises:

identifying a candidate sub-region with a largest area corresponding to one of the at least two candidate sub-regions as the target sub-region.

13. The computer device according to claim 8, wherein the identifying a video segment within the target video according to a scene change status of video frames in the target video comprises:

performing video segmentation on the target video to obtain a video segment corresponding to the scene change status; and acquiring a first key frame in the video segment as the target video frame, the target video frame being a video frame used for determining an implantation location of the recommendation information in the video segment.

14. The computer device according to claim 8, wherein the performing image recognition on the target video frame to obtain a region corresponding to an object in the target video frame that is compatible with the recommendation information comprises:

performing image recognition on the target video frame to obtain a masking result set in the target video frame, each masking result set comprising an object category, an object region, and a confidence level that are of a recognized object; and removing a masking result with a confidence level less than a required confidence level in the masking result set from the masking result set to obtain the region corresponding to the object in the target video frame.

15. A non-transitory computer-readable storage medium, storing at least one instruction, the at least one instruction, when executed by a processor of a computer device, causing the computer device to perform a plurality of operations including:

acquiring a target video;

identifying a video segment within the target video according to a scene change status of video frames in the target video, the video segment including a target video frame;

performing image recognition on the target video frame to obtain a region corresponding to an object in the target video frame that is compatible with the recommendation information; and implanting the recommendation information in the region of the target video frame, further including:
  determining, from the region of the target video frame, a target sub-region related to the target video frame corresponding to a second object that is compatible with both the object in the target video frame and the recommendation information;
  determining, within the target sub-region, an implantation location of the recommendation information in the target video frame; and
  implanting the recommendation information in the target sub-region of the target video frame.

16. The non-transitory computer-readable storage medium according to claim 15, wherein the identifying a video segment within the target video according to a scene change status of video frames in the target video comprises:
  performing video segmentation on the target video to obtain a video segment corresponding to the scene change status; and
  acquiring a first key frame in the video segment as the target video frame, the target video frame being a video frame used for determining an implantation location of the recommendation information in the video segment.

17. The non-transitory computer-readable storage medium according to claim 15, wherein the performing image recognition on the target video frame to obtain a region corresponding to an object in the target video frame that is compatible with the recommendation information comprises:
  performing image recognition on the target video frame to obtain a masking result set in the target video frame, each masking result set comprising an object category, an object region, and a confidence level that are of a recognized object; and
  removing a masking result with a confidence level less than a required confidence level in the masking result set from the masking result set to obtain the region corresponding to the object in the target video frame.

18. The non-transitory computer-readable storage medium according to claim 15, wherein the determining, from the region of the target video frame, a target sub-region related to the target video frame corresponding to a second object that is compatible with both the object in the target video frame and the recommendation information comprises:
  determining n candidate regions related to the target video frame from the region of the target video frame, n being a positive integer;
  determining a second region corresponding to a central role from the region of the target video frame;
  determining a distance between each of the n candidate regions and the second region; and
  using a region in the n candidate regions that has the largest distance to the second region as the target sub-region.

19. The non-transitory computer-readable storage medium according to claim 15, wherein the determining, within the target sub-region, an implantation location of the recommendation information in the target video frame comprises:
  multiplying a region area of the target sub-region by a preset multiple as a target area of the recommendation information displayed in the target video frame;
  determining a target region corresponding to the recommendation information in the target video frame according to the target area and a display shape of the recommendation information; and
  using a location at which the target region covers the target sub-region as the implantation location of the recommendation information in the target video frame.

20. The non-transitory computer-readable storage medium according to claim 15, wherein the region of the target video frame comprises at least two candidate sub-regions corresponding to a target type, and the determining a target sub-region including the target video frame from the region of the target video frame comprises:
  identifying a candidate sub-region with a largest area corresponding to one of the at least two candidate sub-regions as the target sub-region.

* * * * *